US011105342B2

(12) United States Patent
Williamson et al.

(10) Patent No.: US 11,105,342 B2
(45) Date of Patent: Aug. 31, 2021

(54) TOOL AND METHOD FOR REMOVAL OF VARIABLE STATOR VANE BUSHING

(71) Applicant: General Electric Company, Schenectady, NY (US)

(72) Inventors: Aaron David Williamson, Taylors, SC (US); Bruce Clark Busbey, Greer, SC (US); Kevin Clement Metz, Cumming, GA (US); Cleveland Clifford Matthew Joseph, Jr., Greenville, SC (US); Bhushan Suhas Thatte, Greenville, SC (US)

(73) Assignee: General Electric Company, Schenectady, NY (US)

( * ) Notice: Subject to any disclaimer, the term of this patent is extended or adjusted under 35 U.S.C. 154(b) by 142 days.

(21) Appl. No.: 15/979,606

(22) Filed: May 15, 2018

(65) Prior Publication Data

US 2019/0353182 A1 Nov. 21, 2019

(51) Int. Cl.
*F04D 29/64* (2006.01)
*B23P 19/02* (2006.01)
*B25B 27/02* (2006.01)
*F04D 29/54* (2006.01)

(52) U.S. Cl.
CPC .......... *F04D 29/644* (2013.01); *B23P 19/025* (2013.01); *B25B 27/023* (2013.01); *F04D 29/542* (2013.01)

(58) Field of Classification Search
CPC ......... Y10T 29/53683; Y10T 29/53796; Y10T 29/53848; Y10T 29/53852; Y10T 29/53857; Y10T 29/53878; Y10T 29/53891; B25B 27/00; B25B 27/02; B25B 27/023; B25B 27/14
See application file for complete search history.

(56) References Cited

U.S. PATENT DOCUMENTS

| | | | | |
|---|---|---|---|---|
| 3,579,796 A | * | 5/1971 | Fillion | B25B 27/023 29/263 |
| 3,735,650 A | * | 5/1973 | Weng, Jr. | B25B 27/18 81/53.2 |
| 4,494,290 A | | 1/1985 | Rutledge | |

(Continued)

FOREIGN PATENT DOCUMENTS

JP 04095834 B2 6/2008

*Primary Examiner* — Tyrone V Hall, Jr.
*Assistant Examiner* — Makena S Markman
(74) *Attorney, Agent, or Firm* — Dority & Manning, P.A.

(57) ABSTRACT

A tool for removal of a bushing (such as a bushing of a variable stator vane assembly of a compressor) is provided. The tool includes a cylindrical housing, a lead screw, a threaded nut, and a pulling module with puller arms to engage the bushing. The housing defines a longitudinal axis along which the lead screw extends. The lead screw is rotatably secured within the cylindrical housing by a threaded nut engaged with the lead screw. The pulling module is removably attached to the threaded nut, such that the lead screw passes through the threaded nut before passing through the pulling module. The pulling module is provided with a pair of oppositely disposed puller arms, and each puller arm is provided with a hook portion having an engagement tab configured to engage a respective notch on the bushing. A method of removing the bushing using the tool is also disclosed.

17 Claims, 11 Drawing Sheets

(56) References Cited

U.S. PATENT DOCUMENTS

| | | | |
|---|---|---|---|
| 4,916,791 A | | 4/1990 | Clouse et al. |
| 5,033,180 A | * | 7/1991 | Colson ................. B25B 27/062 |
| | | | 29/259 |
| 5,308,226 A | | 5/1994 | Venkatasubbu et al. |
| H1349 H | | 9/1994 | Kelley |
| 5,593,275 A | | 1/1997 | Venkatasubbu et al. |
| 5,709,018 A | * | 1/1998 | Dugan ................. B23P 19/084 |
| | | | 29/235 |
| 6,092,279 A | * | 7/2000 | Shoup ................. B25B 27/062 |
| | | | 29/259 |
| 7,010,840 B2 | * | 3/2006 | Reale ................... B25B 27/062 |
| | | | 29/255 |
| 7,356,926 B2 | | 4/2008 | Bridges et al. |
| 7,658,368 B2 | * | 2/2010 | Laun ...................... B25C 11/02 |
| | | | 254/18 |
| 8,739,377 B2 | | 6/2014 | Shen |
| 8,746,984 B2 | * | 6/2014 | Putt ....................... F16C 35/073 |
| | | | 384/537 |
| 9,073,190 B2 | * | 7/2015 | Sjosten ............... B25B 27/0064 |
| 10,047,765 B2 | * | 8/2018 | Williamson .......... F01D 17/162 |
| 2005/0278917 A1 | * | 12/2005 | Klann ................... B25B 27/026 |
| | | | 29/214 |
| 2008/0298951 A1 | | 12/2008 | Brault et al. |
| 2016/0160675 A1 | | 6/2016 | Williamson et al. |

* cited by examiner

TOOL AND METHOD FOR REMOVAL OF VARIABLE STATOR VANE BUSHING

TECHNICAL FIELD

The present disclosure is generally directed to the field of gas turbines, as may be used in the generation of electrical power. More specifically, the disclosure is directed to a tool and method for the removal of bushings used in the variable stator vanes of a compressor of a gas turbine.

BACKGROUND

Gas turbines are widely used in industrial and commercial operations. A typical gas turbine includes an axial compressor at the front, one or more combustors around the middle, and a turbine at the rear. The compressor generally includes alternating stages of circumferentially mounted stator vanes and rotating blades. The stator vanes typically attach to a casing surrounding the compressor, and the rotating blades typically attach to a rotor inside the compressor. Ambient air enters the compressor, and each stage of stator vanes directs the airflow onto the following stage of rotating blades to progressively impart kinetic energy to the working fluid (air) to bring it to a highly energized state. The working fluid exits the compressor and flows to the combustors where it mixes with fuel and ignites to generate combustion gases having a high temperature, pressure, and velocity. The combustion gases exit the combustors and flow to the turbine where they expand to produce work. For example, expansion of the combustion gases in the turbine may rotate a shaft connected to a generator to produce electricity.

Some compressors are configured with one or more stages of variable stator vanes, whose position is adjusted during various operating conditions. These variable stator vanes are rotatably coupled about a longitudinal vane axis that extends generally radially outward from the axial centerline of the compressor. The angular orientation of the variable stator vanes, relative to the airflow through the compressor, is adjustable to facilitate improved performance at different operating conditions. For example, the stator vanes may be aligned further from the axial centerline of the compressor to suppress the onset of compressor stall at lower rotational speeds associated with start-up or shut-down of the compressor. Conversely, the stator vanes may be aligned closer to the axial centerline of the compressor to allow more working fluid to flow through the compressor and increase the power output of the gas turbine during heavy or sudden increases in electrical demand on the generator.

At least some know variable stator vanes include a trunnion that extends through an opening defined in a casing of the compressor and a generally annular bushing between the trunnion and the opening. The bushing, which may include a protective coating on its interior surface, helps to decrease friction between the trunnion and the casing and to reduce wear on the trunnion. However, over time, at least some known bushings eventually require replacement due to operational wear (e.g., wear in the protective coating). Typically, access to an interior of the casing and, in some cases, removal of a rotor of the gas turbine, is necessary to remove and replace such known bushings. Removal of a rotor requires the assembly and use of a crane, which is costly and time-consuming. Thus, such required disassembly significantly increases the time and costs associated with replacing the bushings.

SUMMARY

According to one aspect provided herein a tool for removal of a bushing (such as a bushing of a variable stator vane assembly of a compressor) is provided. The tool includes a cylindrical housing, a lead screw, a threaded nut, and a pulling module with puller arms to engage the bushing. The housing defines a longitudinal axis along which the lead screw extends. The lead screw is rotatably secured within the cylindrical housing by a threaded nut engaged with the lead screw. The pulling module is removably attached to the threaded nut, such that the lead screw passes through the threaded nut before passing through the pulling module. The pulling module is provided with a pair of oppositely disposed puller arms, and each puller arm is provided with a hook portion having an engagement tab configured to engage a respective notch on the bushing.

According to another aspect provided herein, a method of removing a bushing from a component is provided. The method includes: positioning a removal tool radially outward from the bushing, the removal tool comprising a cylindrical housing defining a longitudinal axis; disposing a pair of puller arms of the removal tool in a corresponding pair of notches defined in the bushing, each puller arm being provided with a hook portion having an engagement tab configured to engage a respective notch of the corresponding pair of notches; and rotating a lead screw of the removal tool to adjust the position of a threaded nut and a pulling module removably attached to the threaded nut until the bushing is removed, the pulling arms being part of the pulling module and the lead screw extending through the cylindrical housing along the longitudinal axis.

BRIEF DESCRIPTION OF THE DRAWINGS

The specification, directed to one of ordinary skill in the art, sets forth a full and enabling disclosure of the present system and method, including the best mode of using the same. The specification refers to the appended figures, in which.

DETAILED DESCRIPTION

Figure 1:
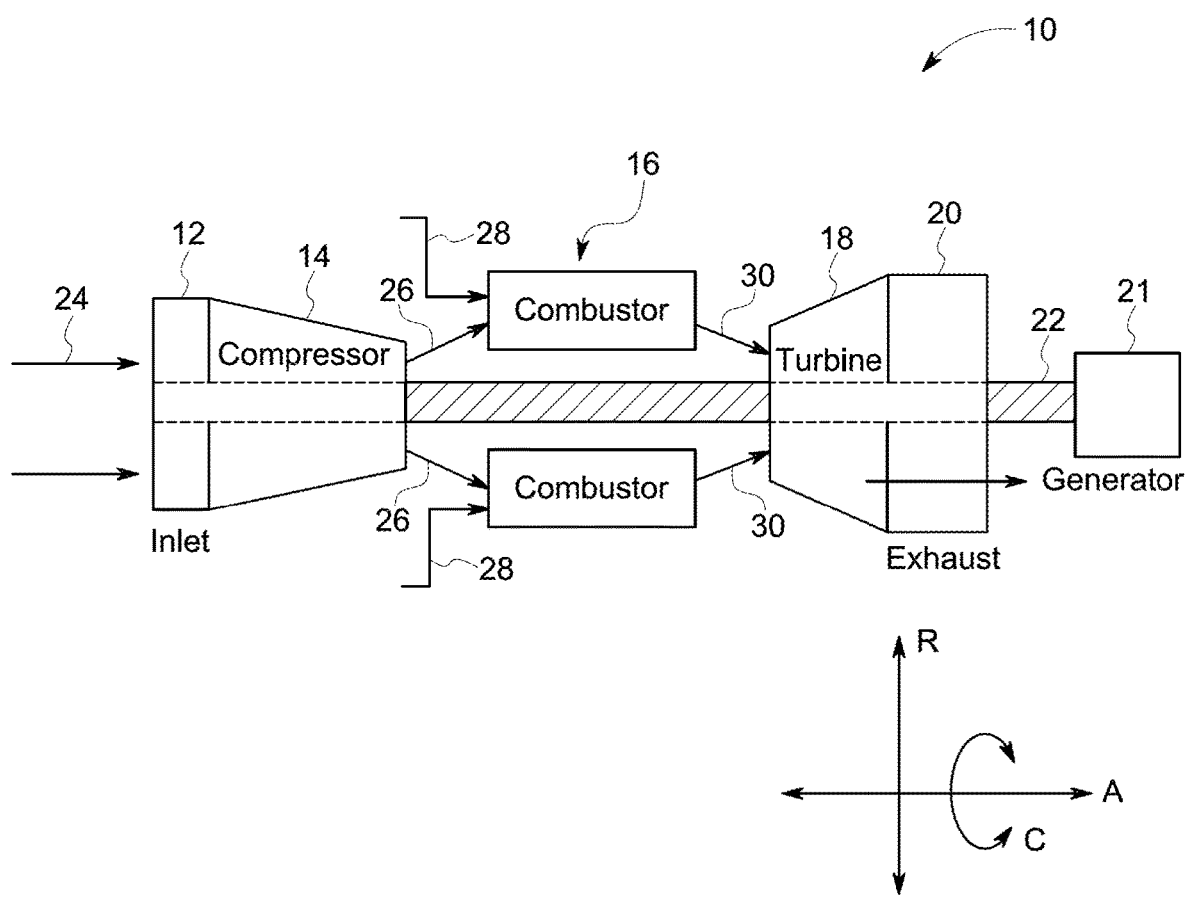
FIG. 1 is a schematic diagram of an exemplary gas turbine.

Reference will now be made in detail to various embodiments of the present disclosure, one or more examples of which are illustrated in the accompanying drawings. The detailed description uses numerical and letter designations to refer to features in the drawings. Like or similar designations in the drawings and description have been used to refer to like or similar parts of the disclosure.

To clearly describe the current removal tool and method, certain terminology will be used to refer to and describe relevant machine components within the scope of this disclosure. To the extent possible, common industry terminology will be used and employed in a manner consistent with the accepted meaning of the terms. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single integrated part.

In addition, several descriptive terms may be used regularly herein, as described below. The terms "first", "second", and "third" may be used interchangeably to distinguish one component from another and are not intended to signify location or importance of the individual components. As used herein, "downstream" and "upstream" are terms that indicate a direction relative to the flow of a fluid, such as the working fluid through the turbine engine. The term "downstream" corresponds to the direction in which a flow of the fluid moves, and the term "upstream" refers to the direction opposite to the flow (i.e., the direction from which the fluid flows). The terms "forward" and "aft," without any further specificity, refer to relative position, with "forward" being used to describe components or surfaces located toward the front (or compressor) end of the engine, and "aft" being used to describe components located toward the rearward (or turbine) end of the engine.

It is often required to describe parts that are disposed at different radial, axial, and/or circumferential positions. As shown in FIG. 1, the "A" axis represents an axial orientation. As used herein, the terms "axial" and/or "axially" refer to the relative position/direction of objects along axis A, which is substantially parallel with the axis of rotation of the gas turbine system. As further used herein, the terms "radial" and/or "radially" refer to the relative position or direction of objects along an axis "R", which intersects axis A at only one location. In some embodiments, axis R is substantially perpendicular to axis A. Finally, the term "circumferential" refers to movement or position around an axis (e.g., axis "C"). The term "circumferential" may refer to a dimension extending around a center of a respective object (e.g., a rotor) and may refer to a dimension extending around the radial axis R.

The terminology used herein is provided only to describe particular embodiments and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as fall within the scope of the appended claims and their equivalents.

Embodiments within the scope of the present disclosure provide a tool and method for removing a bushing from a variable stator vane of a compressor. Although exemplary embodiments of the present disclosure will be described generally in the context of a bushing associated with a variable stator vane of a compressor for a land-based power-generating gas turbine, one of ordinary skill in the art will readily appreciate that embodiments of the present disclosure may be applied to affect the removal of any type of bushing and are not limited to compressor bushings for land-based power-generating gas turbines unless specifically recited in the claims.

Referring now to the drawings, FIG. 1 schematically illustrates an exemplary gas turbine 10. The gas turbine 10 generally includes an inlet section 12, a compressor 14 disposed downstream of the inlet section 12, a combustion section 16 disposed downstream of the compressor 14, a turbine 18 disposed downstream of the combustion section 16, and an exhaust section 20 disposed downstream of the turbine 18. Additionally, the gas turbine 10 may include one or more shafts 22 (also known as "rotors") that couple the compressor 14 to the turbine 18.

During operation, air 24 flows through the inlet section 12 and into the compressor 14, where the air 24 is progressively compressed, thus providing compressed air 26 to the combustion section 16. At least a portion of the compressed air 26 is mixed with a fuel 28 within the combustion section 16 and burned to produce combustion gases 30. The combustion gases 30 flow from the combustion section 16 to into the turbine 18, where thermal and/or kinetic energy is transferred from the combustion gases 30 to rotor blades (not shown) attached to the shaft 22, thereby causing the shaft 22 to rotate. The mechanical rotational energy may then be used for various purposes, such as to power the compressor 14 and/or to generate electricity, via a generator 21 coupled to the shaft 22. The combustion gases 30 exiting the turbine 18 may then be exhausted from the gas turbine 10, via the exhaust section 20.

Figure 2:
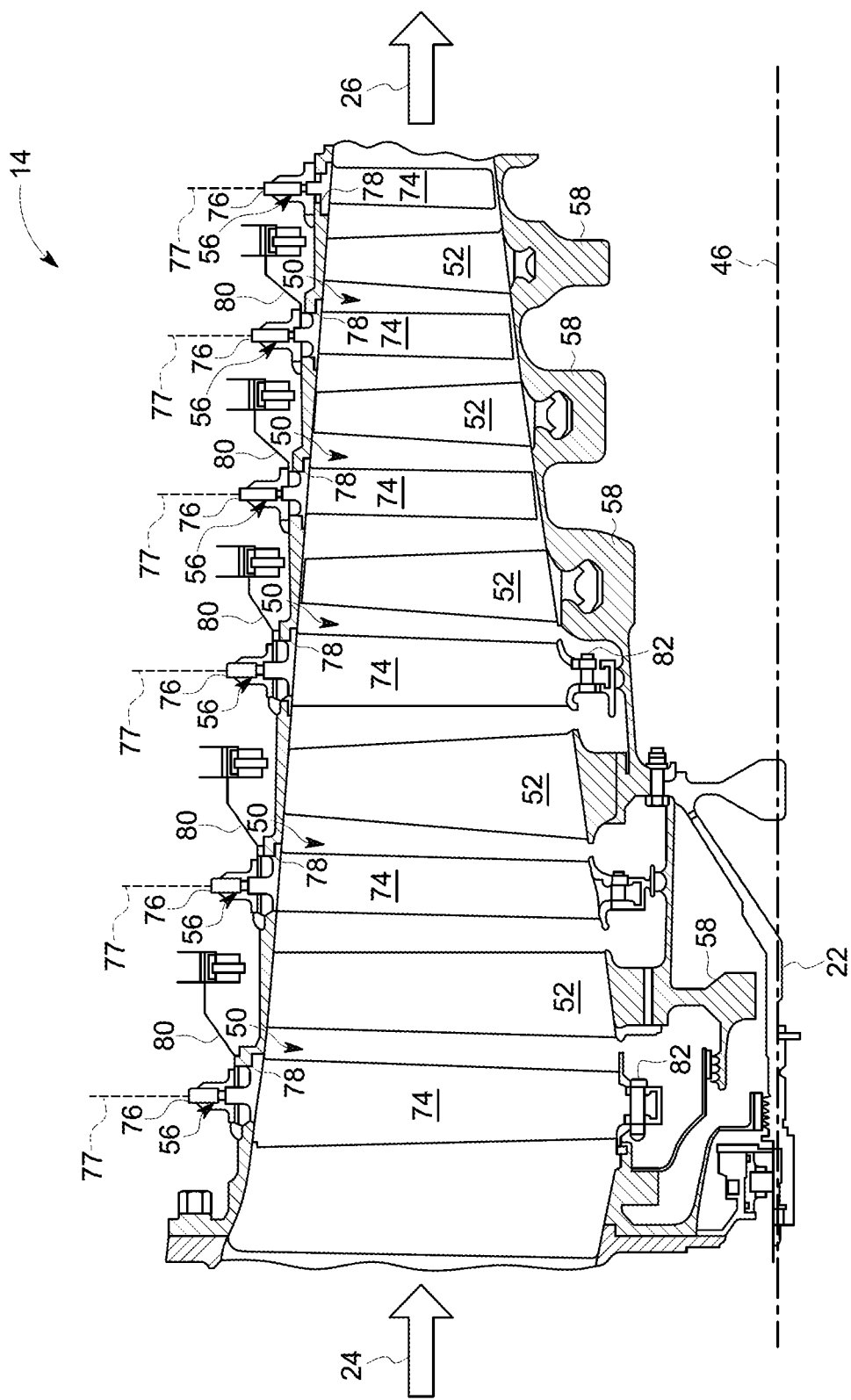
FIG. 2 is a simplified cross-sectional side view of an exemplary compressor that may be used with the gas turbine shown in FIG. 1.

FIG. 2 is a simplified cross-sectional side view of the compressor 14, which includes a plurality of stages 50 of rotating blades 52 and stationary variable stator vane assemblies 56. In each stage, a row of variable stator vane assemblies 56 are upstream from a corresponding row of rotating blades 52. The rotating blades 52 are supported by rotor disks 58 that are coupled to, or that define, the rotor shaft 22. The rotor shaft 22 is circumscribed by a casing 62 (shown in FIG. 3), which supports the variable stator vane assemblies 56. While six stages of the compressor 14 are shown with variable stator vane assemblies 56, it should be understood that the compressor 14 may have more or fewer than six stages with variable stator vane assemblies 56. In some instances, the first set of variable stator vane assemblies 56 may be referred to as inlet guide vanes.

Figure 3:
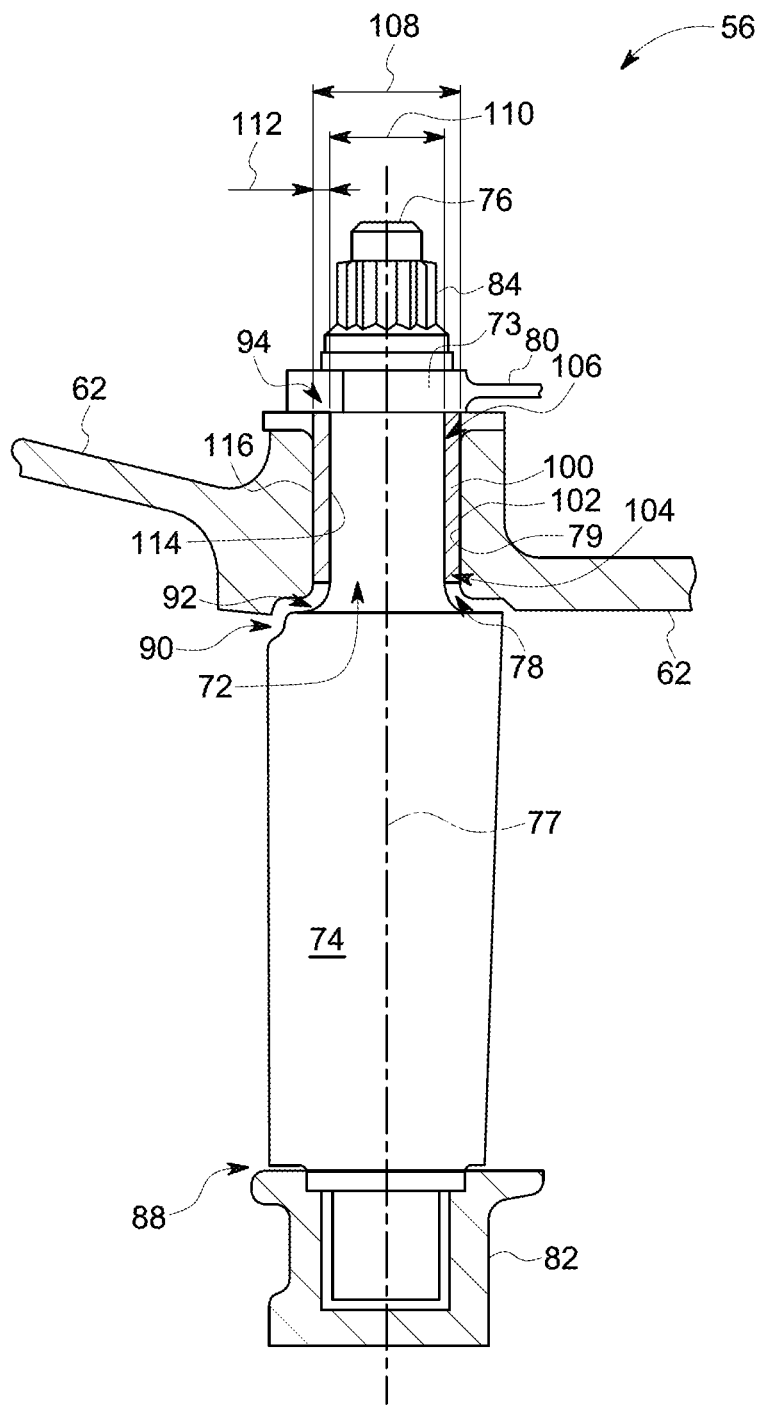
FIG. 3 is a schematic perspective view of an exemplary variable stator vane assembly that may be used with the compressor of FIG. 2.

FIGS. 2 and 3 illustrate the exemplary variable stator vane assembly 56, as found within the compressor 14. Each variable stator vane assembly 56 includes an airfoil 74 that extends generally radially (with respect to a centerline 46 of the compressor 14) from a radially inner first end 88, which is coupled to a stationary inner casing 82, to a radially outer second end 90. Each variable stator vane assembly 56 also includes a trunnion 72 coupled to the airfoil 74 at the radially outer end 90, the trunnion 72 extending from a radially inner first end 92 (coupled to the radially outer end 90) to a radially outer second end 94. The trunnion 72 extends through an opening 78 defined in, and extending through, the casing 62. The opening 78 is defined by a circumferentially extending wall 79.

The radially outer end 94 of the trunnion 72 includes a trunnion seat 73 and a vane stem 76 extending radially outward from the trunnion seat 73. A vane stem nut 84 is removably coupled to the vane stem 76 to secure the variable stator vane assembly 56 to the casing 62. The trunnion 72 and the trunnion seat 73 couple the airfoil 74 to a lever arm 80 for rotation about a longitudinal axis 77 of the airfoil 74. More specifically, the lever arm 80 is operable to adjust a rotational orientation of the airfoil 74 about the longitudinal axis 77. The airfoils 74 are positioned in a flow path defined through the upstream end of the compressor 14 (shown in FIG. 2), and the rotational orientation of the airfoils 74 is selected to control the airflow 24 therethrough.

In an exemplary embodiment, the airfoil 74, the trunnion 72, and the vane stem 76 are formed integrally together. In alternative embodiments, at least one of the airfoil 74, the trunnion 72, and/or the vane stem 76 is formed independently and is then coupled to the other components in any suitable fashion.

Figure 4:
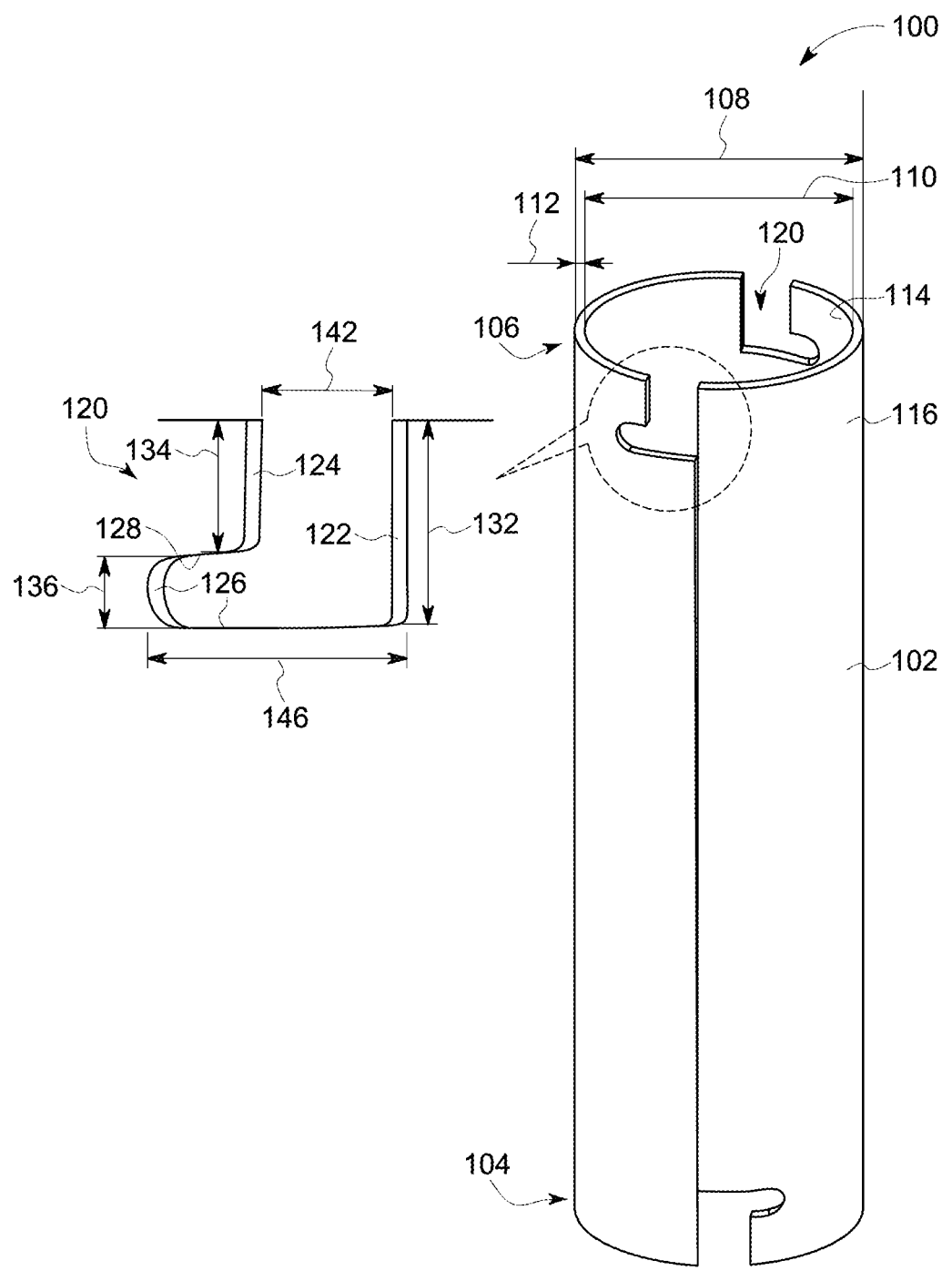
FIG. 4 is a perspective view of a bushing that may be used with the variable stator vane assembly of FIG. 3.

The variable stator vane assembly 56 also includes a bushing 100 between the trunnion 72 and the wall 79 defining the opening 78 through the casing 62. As shown in FIG. 4, the bushing 100 includes a cylindrical body 102 that extends generally axially, with respect to the longitudinal axis 77, between a body first end 104 and a body second end 106. The body 102 is annular in shape and centered along the longitudinal axis 77, such that (by sliding in an axial direction) the bushing 100 can be inserted into, and subsequently removed from, the annulus between the trunnion 72 and the wall 79 of the casing 62. The body 102 also extends radially, with respect to a center at the longitudinal axis 77, from an inner surface 114 to an outer surface 116 to define a body thickness 112. The body 102 extends circumferentially about the longitudinal axis 77 and has an outer diameter 108 sized to fit within the opening 78 of the casing 62 in an interference fit and an inner diameter 110 sized to receive the trunnion 72 in a clearance fit that enables rotation of the trunnion 72 and, thus, of the airfoil 74 to which the trunnion 72 is connected.

The bushing 100 includes a pair of oppositely disposed notches 120 that facilitates removal of the bushing 100 from the variable stator vane assembly 56. Each notch 120 has an identical shape and orientation (e.g., both including a circumferential portion pointing in a clockwise direction relative to the longitudinal axis 77, as viewed from the radially outer end of a lead screw 240).

In an alternative embodiment, shown in commonly assigned U.S. Pat. No. 10,047,765, the bushing 100 includes a pair of oppositely-disposed notches 120, wherein the pair of notches 120 are identically shaped but arranged in a mirrored relationship.

In the exemplary embodiment, each notch 120 is defined as a cut-out in the body 102 of the bushing 100. The notch 120 has a boot shape with a first edge 122 extending axially inward over a first distance 132 from a respective end 104, 106 of the body 102 of the bushing 100 and a second edge 124 parallel to the first edge 122 and extending axially inward over a second distance 134 from the respective end 104, 106. The second axial distance 134 (or length) is shorter than the first axial distance 132 (or length).

An inner edge 126 defines a generally J-shape, having a straight portion that connects to the first edge 122 and a curved portion that connects to the second edge 124. The generally J-shaped edge 126 spans a third axial distance 136, such that the addition of the second distance 134 and the third distance 136 are equal to, or approximately equal to, the first distance 132. The curved portion of the generally J-shaped edge 126 that connects to the second edge 124 and that is disposed opposite the straight portion defines an engagement surface 128 used for removal of the bushing 100, as described further herein.

The first edge 122 and the second edge 124 are separated circumferentially from one another by a circumferential distance or width 142, which defines the open end of the notch 120. The first edge 122 and the most remote portion of the generally J-shaped inner edge 126 are separated circumferentially from one another by a circumferential distance or width 146, which defines the closed end of the notch 120. The circumferential width 142 at the open end of the notch 120 is smaller than the circumferential width 146 at the closed end of the notch 120. The engagement surface 128 is located axially between the open end of the notch 120 and closed end of the notch 120.

The boot-shaped notch 120 includes a first area defined between the first edge 122 and the second edge 124 and extending over the second axial distance 134 and the circumferential width 142; and a second area defined between the first edge 122 and the generally J-shaped inner edge 126 and extending over the third axial distance 136 and the circumferential width 146. The third axial distance 136 is smaller than the second axial distance 134. The circumferential width 142 is smaller than the circumferential width 146.

Each notch 120 may be formed within the annular body 102 by stamping out a desired shape from a sheet of material before the sheet material is shaped into the annular body 102. In alternate embodiments, the notch 120 may be formed within the annular body 102 by any suitable process (including processes that do not require cutting). Moreover, the body 102 may be provided with a pair of notches 120 at both the first end 104 and the second end 106, so that the bushing 100 may be installed in either direction.

FIGS. 5 through 11 illustrate various aspects of tools 200, 300 for the removal of the bushing 100, which may be used in a variable stator vane assembly 56 of a compressor 14.

Figure 5:
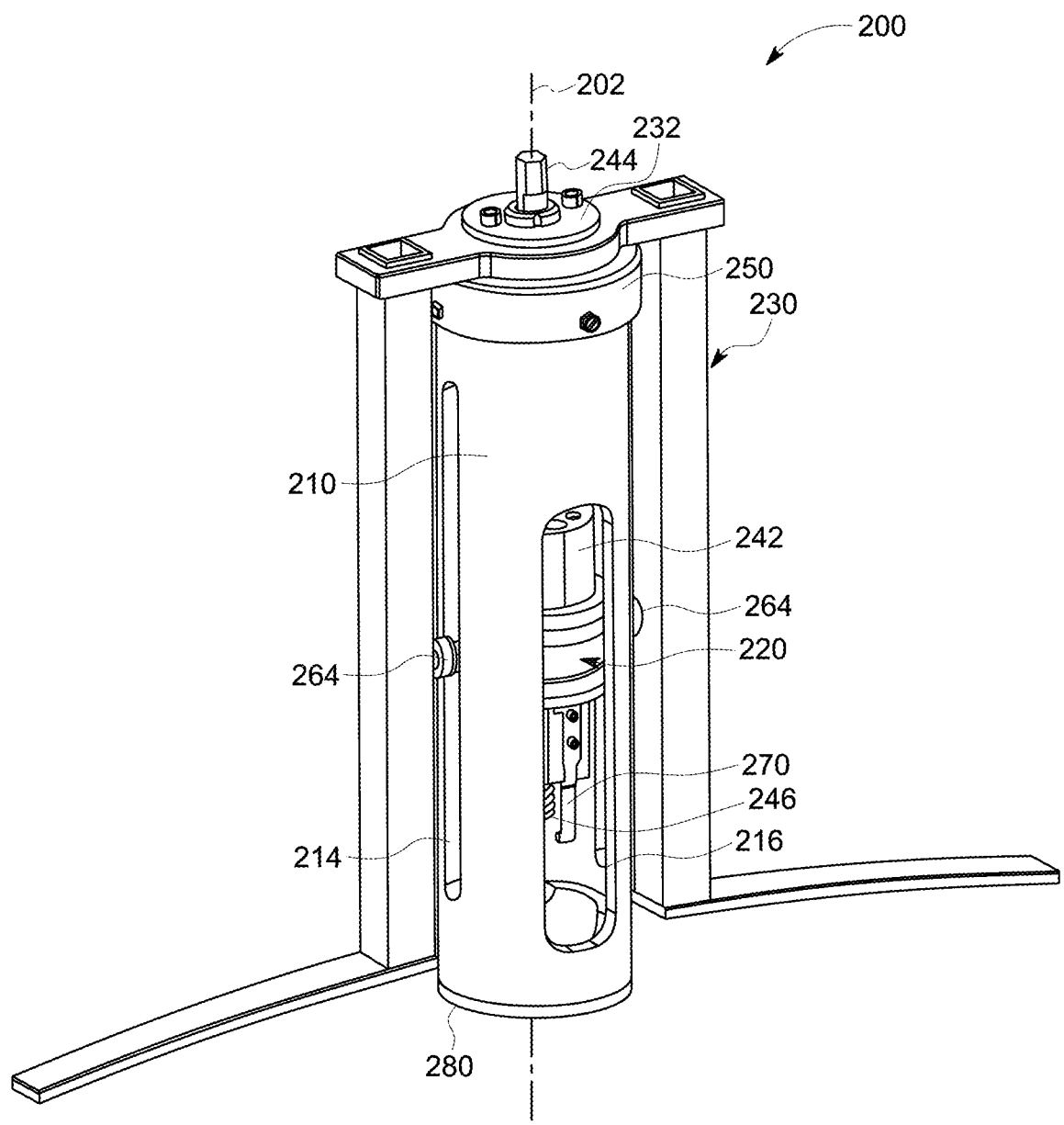
FIG. 5 is a perspective view of an exemplary tool that may be used to remove the bushing of FIG. 4 from the variable stator vane assembly of FIG. 3, according to one aspect of the present disclosure.
Figure 6:
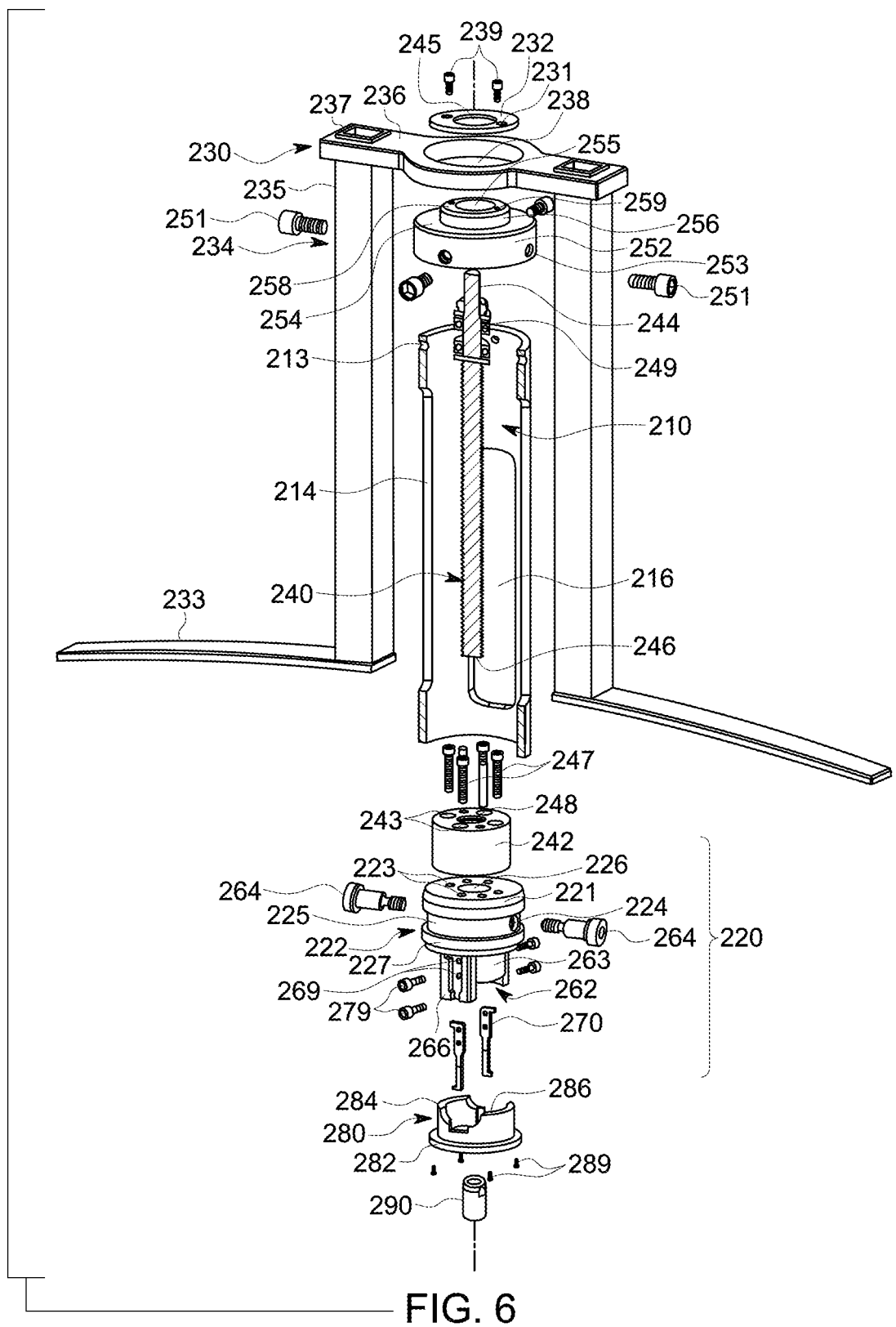
FIG. 6 is an exploded view of the second exemplary tool of FIG. 5.

As shown in FIGS. 5 and 6, a tool 200 includes a cylindrical housing 210, a pulling module 220, and, optionally, a stabilizing structure 230 including reaction arms 234. The cylindrical housing 210 defines a longitudinal axis 202 of the tool 200, which is aligned with the longitudinal axis 77 of the vane stem 76, when the tool 200 is in use.

The cylindrical housing 210 defines a first pair of elongate slots 214 that are disposed opposite one another relative to the longitudinal axis 202 of the tool 200. The elongate slots 214 are sized and configured to function as a guide for a pair of anti-rotation pins 264, as discussed below. The cylindrical housing 210 may further define a second pair of elongate slots 216 that are disposed opposite one another relative to the longitudinal axis 202 of the tool 200 to provide visibility of the bushing 100, as the bushing 100 is being removed. In one embodiment, the elongate slots 214, 216 are spaced evenly, in the circumferential direction, around the housing 210. In some instances, the elongates slots 216 may be wider in the circumferential direction than the elongate slots 214. In other embodiments, the elongate slots 216 may be omitted. In yet other embodiments, more than two elongate slots 216 may be used (for example, each elongate slot 216 may be divided into two or more slots along a common axis).

In determining whether to include the elongate slots 216 in the housing 210 and with what dimensions, it has been found advantageous to balance the need for structural integrity of the housing 210 with the desire to reduce the overall weight of the tool 200 and to increase the visibility of the bushing 100 during the removal process. The material used to create the housing 210 and its thickness are factors in this balancing equation.

The threaded lead screw 240 extends through the cylindrical housing 210 along a longitudinal axis 202 of the tool 200 and is secured, at an inner end 246, by a threaded nut 242. The rotation of the lead screw 240 (manually or by mechanical, electrical, or pneumatic actuation) carries the pulling module 220 into engagement with the bushing 100 and, once engaged, conveys the pulling module 220 in a direction radially outward from the compressor 14 to remove the bushing 100.

An outer end of the lead screw 240 (relative to the longitudinal axis 202) is coupled to a drive attachment 244 via a ball bearing and lock washer assembly 249. A rotary component of the ball bearing and lock washer assembly 249 is attached to the lead screw 240, and a stationary component of the assembly 249 is attached to the stacked flange 250. The ball bearing and lock washer assembly 249 eases the relative rotary motion of the lead screw 240 about the axis 202 and alleviates friction between the lead screw 240 and the stacked flange 250 during rotation. The lead screw 240 may be described as being "rotatably secured" to the cylindrical housing 210, which means that the lead screw 240 is secured in a position coincident with the longitudinal axis 202 in a manner that permits rotation of the lead screw 240 about the axis 202.

In one embodiment, the lead screw 240 is an Acme screw characterized by a particular trapezoidal thread form that can be easily checked using readily available thread gauges and that is designed for interchangeability. Alternately, other types of lead screws, including ball-type lead screws and roller-type lead screws, may be used with appropriate nuts.

Figure 7:
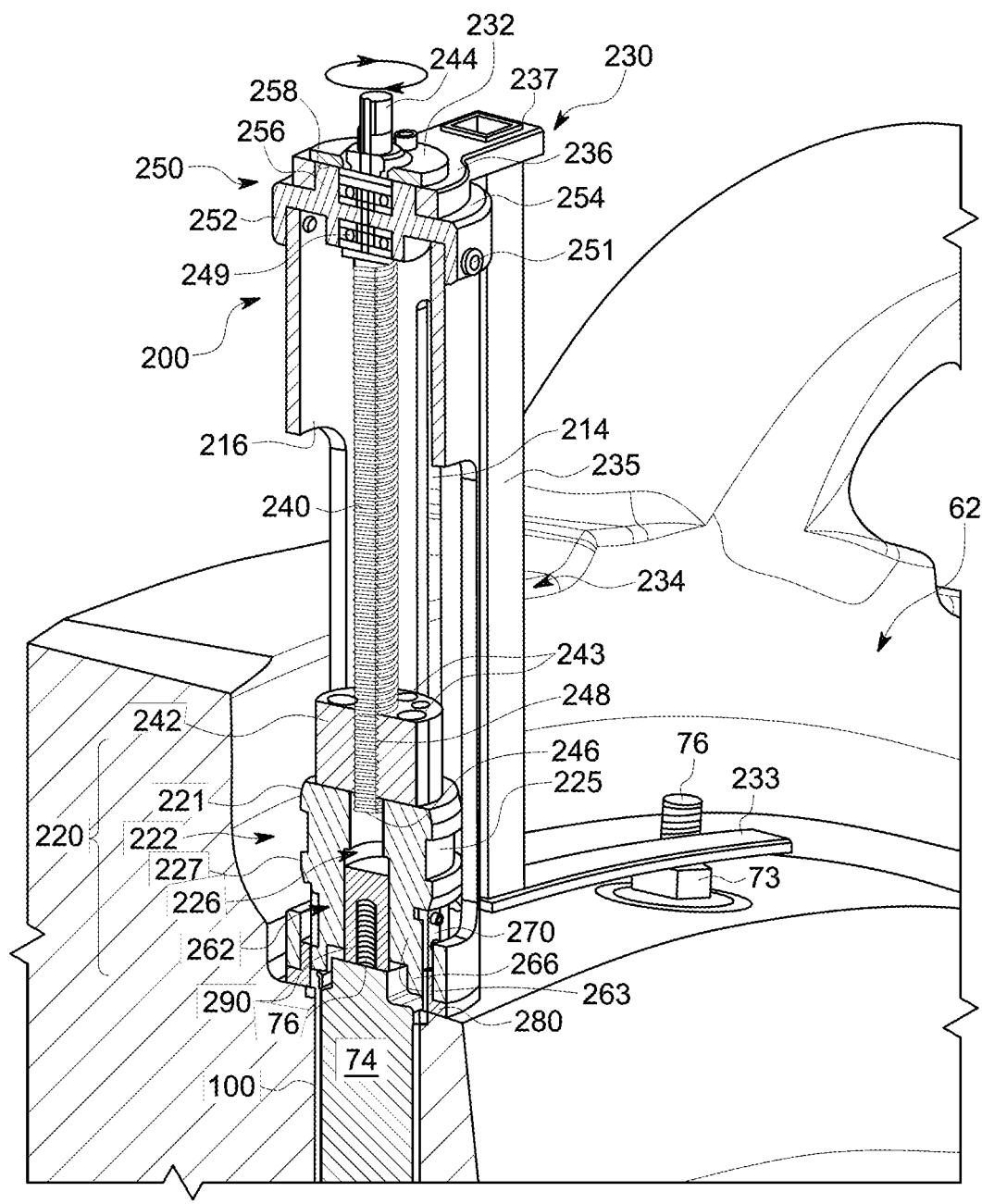
FIG. 7 is a sectional perspective view of the tool of FIG. 5, as engaged with the bushing of FIG. 4.

The drive attachment 244 of the lead screw 240 extends through a hole 255 in a stacked flange 250 and, when the optional stabilizing structure 230 is used, through a hole 245 in a retention plate 232 used to join the stabilizing structure 230 to the housing 210. The stacked flange 250 includes a first cylindrical shell 252 having a diameter slightly larger than the cylindrical housing 210, a first flange surface 254 connected to the first cylindrical shell 252, a second cylindrical shell 256 having a diameter smaller than the first cylindrical shell 252 and extending radially inward and outward from the first flange surface 254 (as shown in FIG. 7), and a second flange surface 258 connected to the second cylindrical shell 256. The hole 255 extends through the second cylindrical shell 256, which has an annular projection (not separately identified) to house the ball bearing and lock washer assembly 249.

The first cylindrical shell 252 defines a set of apertures 253 in the radial direction through which fasteners 251 may be positioned, such that, when the stacked flange 250 is positioned over a perimeter of the cylindrical housing 210, the stacked flange 250 may be coupled to the cylindrical housing 210. The cylindrical housing 210 may be provided with a corresponding arrangement of radially-oriented apertures 213 for receipt of the fasteners 251. The second flange surface 258 may be provided with screw holes 259 in an axial (longitudinal) direction for receipt of screws 239 that join the stabilizing structure 230 to the stacked flange 250 and, therefore, the housing 210.

Figure 8:
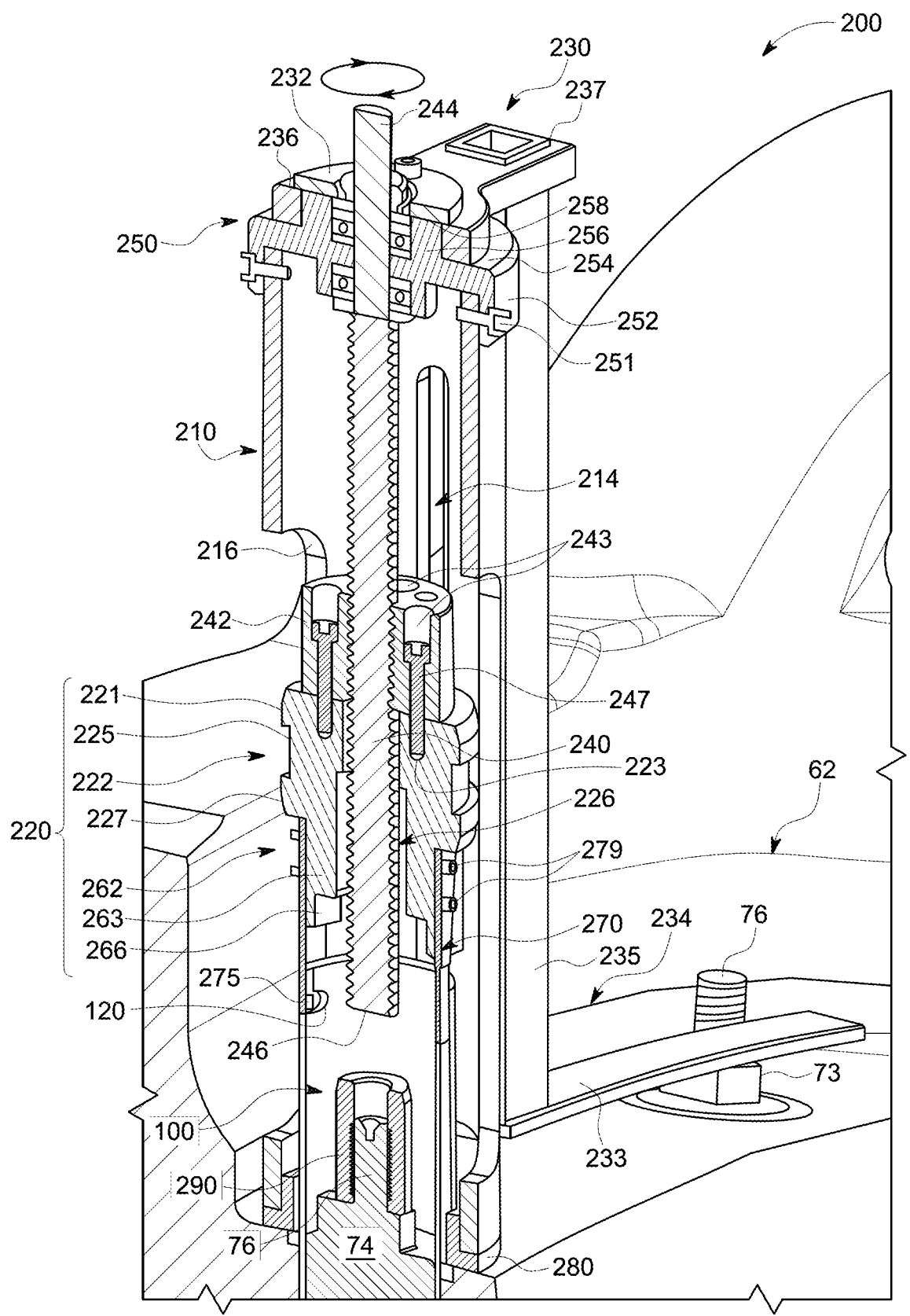
FIG. 8 is a sectional perspective view of the tool of FIG. 5, illustrating the partial removal of the bushing of FIG. 4 from the variable stator vane assembly of FIG. 3.

The inner end 246 of the lead screw 240 is threaded through a threaded hole 248 in the threaded nut 242 and may extend beyond the threaded nut 242 (as shown in FIGS. 7 and 8). The threaded nut 242 may be provided with a circular array of fastener holes 243 in the longitudinal direction for receiving a corresponding plurality of fasteners 247, such that the threaded nut 242 may be removably coupled to the pulling module 220.

The pulling module 220 includes a spool-shaped body 222 that is materially integrated with, or otherwise coupled to, a generally U-shaped projection 262. The spool-shaped body 222 includes a first attachment flange 221 having a diameter larger than that of the threaded nut 242 and slightly smaller than the inner diameter of the cylindrical housing 210. The first attachment flange 221 defines an array of fastener holes 223 in the longitudinal direction that correspond to the circular array of fastener holes 243 in the threaded nut and that are configured to receive the fasteners 247.

The spool-shaped body 222 further includes a second attachment flange 227 from which the generally U-shaped projection 262 extends, the second attachment flange 227 having the same diameter as the first attachment flange 221. An intermediate spool cylinder 225 extends between the first attachment flange 221 and the second attachment flange 227. In one embodiment, the intermediate spool cylinder 225 defines a spool body diameter smaller than the spool flange diameters of the first attachment flange 221 and the second attachment flange 227. The intermediate spool cylinder 225 defines, along a circumferential (outer) surface thereof, a pair of oppositely disposed, radially-oriented pin sockets 224 for receipt of the pair of anti-rotation pins 264 mentioned above.

The generally U-shaped projection 262 is attached to, or integral with, the second attachment flange 227 and defines a central portion 263 and a pair of oppositely disposed mating panels 266. The central portion 263 defines a first axial length, and the mating panels 266 define a second axial length that is greater than the first axial length. The mating panels 266 define one or more screw holes (for instance, two screw holes) 269 for receipt of a corresponding number of screws 279 that are used to secure each puller arm 270, discussed further below. In one exemplary embodiment, the mating panels 266 are circumferentially offset from the pin sockets 224, such that the screws 279 are offset by 90 degrees from the anti-rotation pins 264.

An unthreaded hole 226 is defined through the spool-shaped body 222 and the central portion 263 of the generally U-shaped projection 262, along the longitudinal axis 202 of the tool 200. The unthreaded hole 226 is sized to receive the lead screw 240 from one end of the unthreaded hole 226 and to accommodate a tool alignment bushing 290 (described below) from the opposite end. As seen in FIG. 7, the first end, or portion, of the unthreaded hole 226 may have a first diameter, and the second end, or portion, of the unthreaded hole 226 may have a second diameter, the first diameter being smaller than the second diameter to act as a stop for the tool alignment bushing 290.

Because the threaded nut 242 is mechanically coupled to the spool-shaped body 222 of the pulling module 220, it is not necessary for both the hole 248 in the threaded nut 242 and the hole 226 in the spool-shaped body 222 to be threaded to match the threads of the lead screw 240. Rather, costs may be reduced, and production of the pulling module 220 may be simplified by employing an unthreaded hole 226 in the spool-shaped body 226 and central portion 263. This design readily accommodates interchanging different pulling modules 220 for bushings 100 of different sizes.

A bushing guide 280, which is attached to the bottom of the housing 210 via screws 289, helps to secure the bushing 100 during removal by providing a contacting surface around at least a portion of the bushing 100. The bushing guide 280 includes a flange 282 and a circumferential wall 284 extending outward from the flange 282, the circumferential wall 284 defining the contacting surface. The circumferential wall 284 includes a pair of oppositely disposed cut-outs 286 that, when installed, align with the mating panels 266 of the generally U-shaped projection 262 and that accommodate the screws 279 that secure the puller arms 270 (as shown in FIG. 7).

The tool alignment bushing 290 may be included with the tool 200 to orient the tool 200 in position over the vane stem 76 of the variable stator vane assembly 56. The tool alignment bushing 290, when used, is threaded onto the vane stem 76 and functions as a guide for aligning the tool 200, such that the tool alignment bushing 290 fits within the unthreaded hole 226 in the pulling module 220 (as shown in FIGS. 7 and 8). The tool alignment bushing 290 helps to prevent misalignment of the tool 200 with the bushing 100, since such misalignment might result in damage to the bushing 100 or other hardware during removal.

Optionally, the tool 200 may include a stabilizing structure 230 that includes a pair of oppositely disposed reaction arms 234 that are coupled to a stabilizing collar 236. Each reaction arm 234 is generally L-shaped, having a relatively flat horizontal arm segment 233 and a square vertical arm segment 235 extending radially outward from an end of the horizontal arm segment 233 proximate to the cylindrical housing 210. The vertical arm segments 235 are connected to the stabilizing collar 236, for example, by disposing through correspondingly sized and shaped openings 237 defined in or through the stabilizing collar 236.

The stabilizing collar 236 also defines a circular orifice 238 between the openings 237, the orifice 238 being sized and configured to receive the second cylindrical shell 256 of the stacked flange 250. According to one aspect provided herein, the second cylindrical shell 256 and the stabilizing collar 236 have the same, or approximately the same, height in the axial direction (i.e., relative to the longitudinal axis 202 of the tool 200). The retention plate 232 joins the stabilizing collar 236 to the second cylindrical shell 256 of the stacked flange 250, via screws 239 that extend through screw holes 231 in the retention plate 232 and that engage the screw holes 259 in the second flange surface 258 of the stacked flange 250. The joining of the retention plate 232 to the stacked flange 250 holds the stabilizing structure 230, while permitting the stabilizing structure 230 to freely rotate about the cylindrical housing 210.

Figure 9:
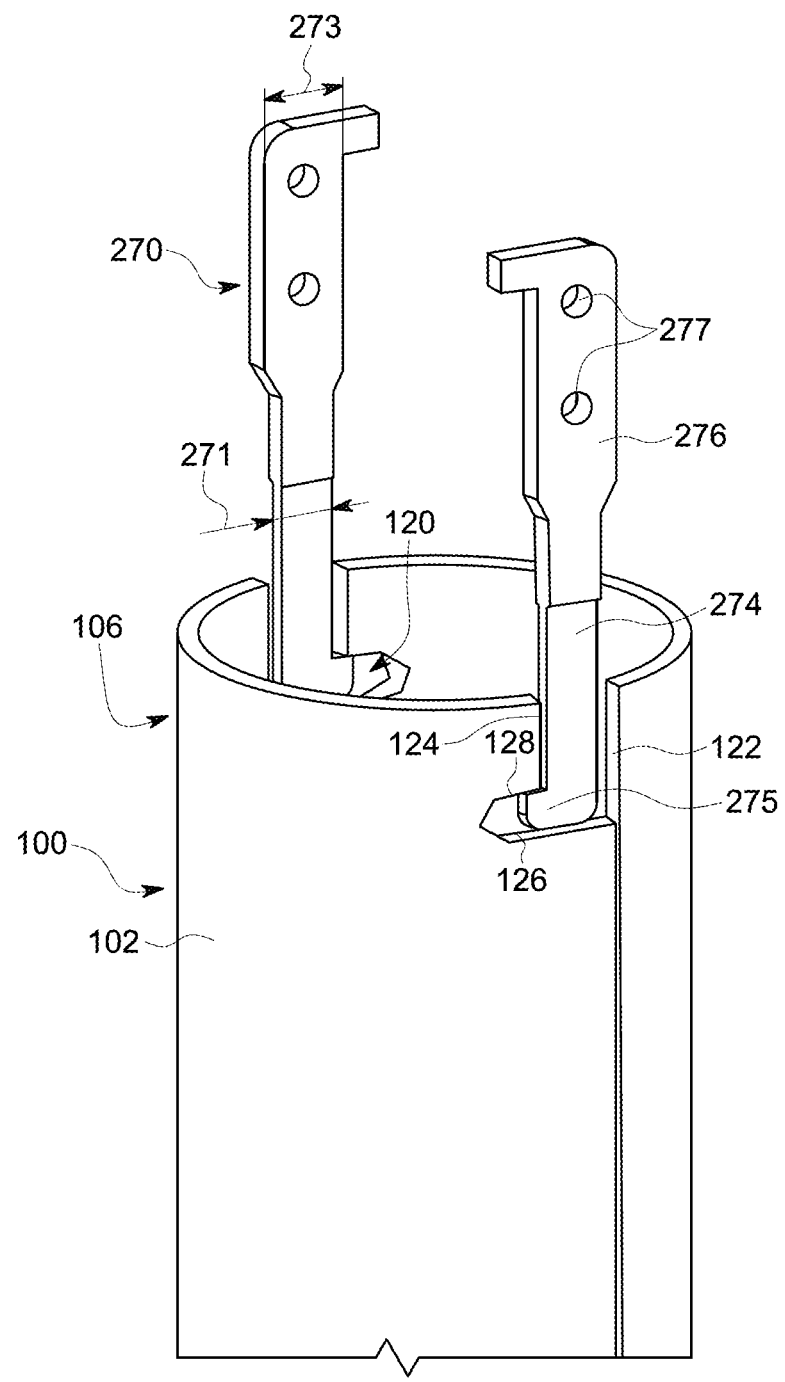
FIG. 9 is a perspective view of the bushing of FIG. 4, which further illustrates the engagement of puller arms with respective notches on the bushing.

FIGS. 7 and 8 illustrate, respectively, the tool 200 as oriented in an upright, or vertical, position for removal of the bushing 100 from the variable stator vane assembly 56 and in the process of removing the bushing 100 from the variable stator vane assembly 56. The vane stem nut 84 is removed from the vane stem 76, the lever arm 80 is rotated away from the vane stem 76, and the tool alignment bushing 290 is threaded onto the vane stem 76. The housing 210 of the tool 200 (excluding the stabilizing structure 230) is lowered into position against the casing 62 of the compressor 14, such that the tool alignment bushing 290 is positioned within the unthreaded hole 226 in the pulling module 220. The housing 210 may be rotated, as necessary, to ensure that the puller arms 270 engage the notches 120 of the bushing 100 (as shown in FIG. 9).

When the stabilizing structure 230 is used, the stabilizing collar 236 is positioned over the stacked flange 252, and the retention plate 232 and screws 239 are used to connect the stabilizing structure 230 to the stacked flange 252. The stabilizing structure 230 may be attached prior to the tool 200 being joined to the tool alignment bushing 290, but may also be attached after the housing 210 is attached to the tool alignment bushing 290.

Once installed, the bushing guide flange 282 of the bushing guide 280 is disposed against the casing 62, which helps resist the axial pulling force along the longitudinal axis 202 required to pull the bushing 100 out of the opening 78 in the casing 62. The two reaction arms 234 (one of which is illustrated in FIGS. 7 and 8) are disposed against the vane stems 76 of the neighboring variable stator vane assemblies 56 on either side of the tool 200, such that contact between the reaction arms 234 and the neighboring vane stems 76 resists the reaction component of the torque required to rotate the lead screw 240 at the drive attachment 244. The reaction arms 234, which rest on the first flange surface 254 of the stacked flange 250, are free to rotate about the longitudinal axis 202, thus absorbing and distributing the reaction torque to the neighboring vane stems 76 and minimizing any physical strain on the technician's hands.

An electric or pneumatic device with an appropriately sized socket may be used to engage the drive attachment 244 and rotate the lead screw 240. Alternately, the lead screw 240 may be rotated manually using a socket wrench or other handheld tool. Depending on the circumferential position of the variable stator vane assembly 56 whose bushing 100 is to be removed, it may be necessary for the technician to hold the housing 210 of the tool 200 while the bushing 100 is being removed.

As shown in FIG. 7, the tool alignment bushing 290 is installed over the vane stem 76, and the tool 200 is positioned over the tool alignment bushing 290, such that the bushing guide 280 contacts the casing 62 and the puller arms 270 engage the notches 120 of the bushing 100. The rotation of the lead screw 240 causes the threaded nut 242 to move in an upward direction (i.e., away from the variable stator vane assembly 56). Because the threaded nut 242 is coupled to the pulling module 220, the pulling module 220 is also directed upward by the rotation of the lead screw 240. The rotational movement of the threaded nut 242 and, therefore, the pulling module 220 is restrained by the anti-rotation pins 264 that are slideably engaged within, and travel through, the slots 214 in the cylindrical housing 210. As the pulling module 220 moves (in a direction away from the casing 62), the bushing 100 is removed.

FIG. 8 illustrates the results of the rotation of the lead screw 240, in that the pulling module 220 has almost completely withdrawn the bushing 100 from the annulus 78 between the vane stem 76 and the wall 79 defining an opening in the casing 62. The bushing guide 280 has an inner diameter that approximates the outer diameter of the bushing 100, so that an inner surface of the bushing guide 280 provides for firm sliding contact with an outer surface of the bushing 100 to support the bushing 100 as it is withdrawn from the annulus 78.

Figure 10:
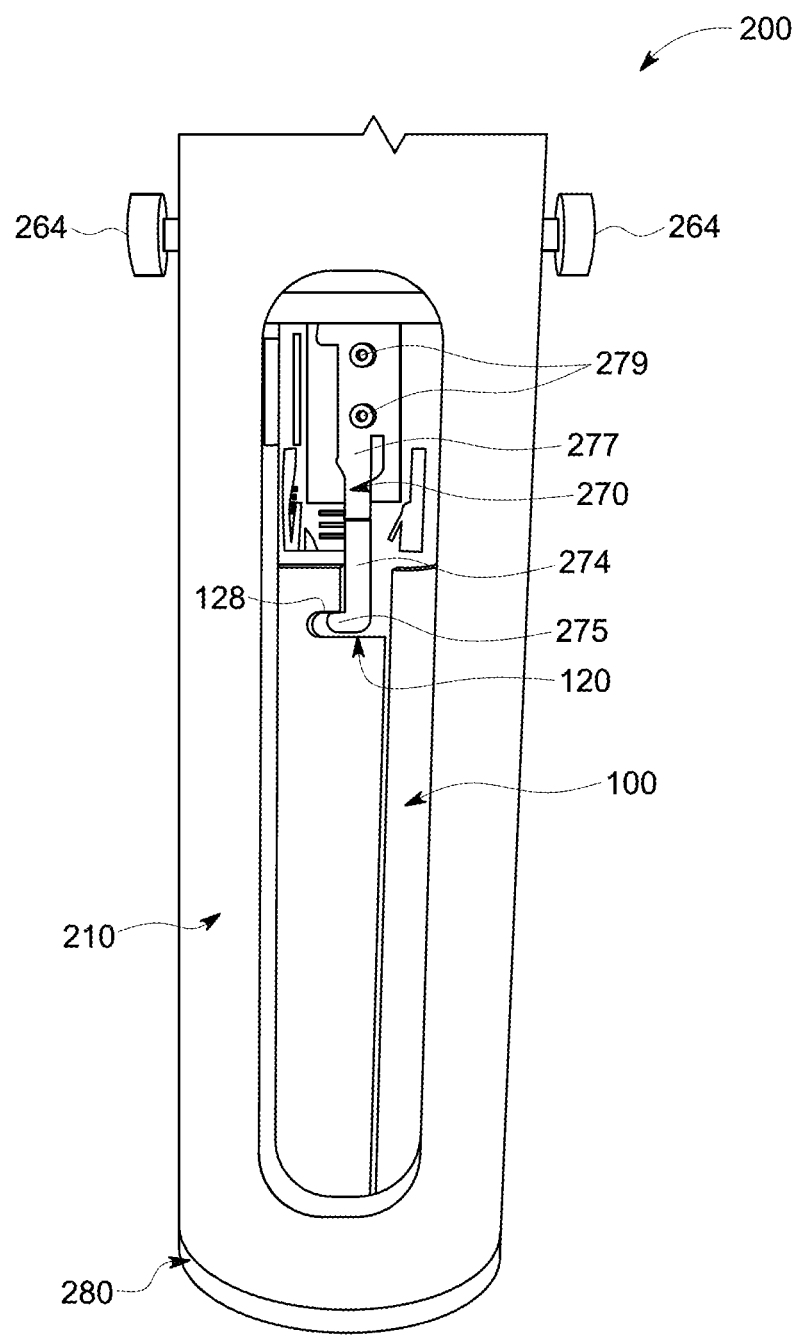
FIG. 10 is a side perspective view of the tool of FIG. 5, showing the bushing of FIG. 4, as removed from the variable stator vane assembly of FIG. 3 and disposed within a housing of the tool.

The movement of the pulling module 220 may be observed through the slots 216 in the housing 210. Alternately, or additionally, the movement of the anti-rotation pins 264 (as shown in FIG. 5) along the slots 214 may be monitored to assess the progress of the removal of the bushing 100. Additional rotation of the lead screw 240 results in the complete removal of the bushing 100 (as shown in FIG. 10), after which the tool 200 may be removed, and the tool alignment bushing 290 may be removed from the vane stem 76. A new bushing 100 may be inserted into the annulus 78, and the lever arm 80 may be reattached to the vane stem 76 and secured by the vane stem nut 84.

In practice, a technician replacing the bushings 100 may mark the vane stem 76 or an adjacent area on the casing 62 (for example, using a paint pen) to denote the completion of the bushing removal and replacement process for a particular variable stator vane assembly 56. The technician may then move on to an adjacent variable guide vane assembly 56 and remove its bushing 100. In this manner, the technician may work around the circumference of the stator stage, thereby ensuring that each bushing 100 has been successfully removed and replaced. Although sequential removal may be most efficient for a single technician, it is not necessary that the bushings 100 be removed in any specific order. Advantageously, the removal and replacement of the bushings 100 may be accomplished without dismantling the upper and lower halves of the casing 62, without removing the rotor, and without engaging a crane to move the rotor, thus significantly reducing the maintenance time and costs associated with the bushing removal.

FIG. 9 illustrates the engagement of the puller arms 270 with the notches 120 of the bushing 100. As shown, each puller arm 270 includes a mounting panel 276 that defines one or more mounting holes 277. The mounting holes 277 are sized and arranged to align with the screw holes 269 in the mating panels 266 of the generally U-shaped projection 262, such that the screws 279 fit through the mounting holes 277 and the screw holes 269 to removably attach the puller arms 270. The mounting panel 276 has a width 273 in the circumferential direction, relative to the longitudinal axis 202.

Each puller arm 270 also includes a generally L-shaped hook portion 274 integral with and extending from the mounting panel 276. The hook portion 274 is generally rectangular and has a hook width 271 (of the vertical portion) that is smaller than the mounting panel width 273 and the width 142 (as shown in FIG. 4) at the open end of the notch 120. The distal end of the hook portion 274 defines an engagement tab 275 that has a tab width greater than the hook width 271 and less than the width 146 (as shown in FIG. 4) at the closed end of the notch 120. The inside and outside radii of the engagement tab 275 approximates the respective inside and outside radii of the notch 120 in the bushing 100.

The engagement tab 275 contacts the engagement surface 128 of the notch 120 to permit removal of the bushing 100. As described above, the anti-rotation pins 264 prevent pulling module 220 from rotating and the puller arms 270 from being dislodged during the removal of the bushing 100. To balance out the eccentric loads and to promote uniform pulling action, the engagement tabs 275, like the notches 120, each point in the same direction, when viewed from the drive attachment 244 at the radially outer end of the lead screw 240 and relative to the longitudinal axis 77 (e.g., a clockwise direction, although the notches 120 and tabs 275 may be oriented to point in a counter-clockwise direction).

FIG. 10 illustrates the removed bushing 100 within the housing 210 of the removal tool 200. The bushing 100 may be seen through the elongated slot 216 in the housing. The engagement tab 275 of the hook portion 274 of the puller arm 270 is engaged with the notch 120 in the bushing 100, and the anti-rotation pins 264 prevent the rotation of the lead screw 240 from being translated to the pulling module 220.

Figure 11:
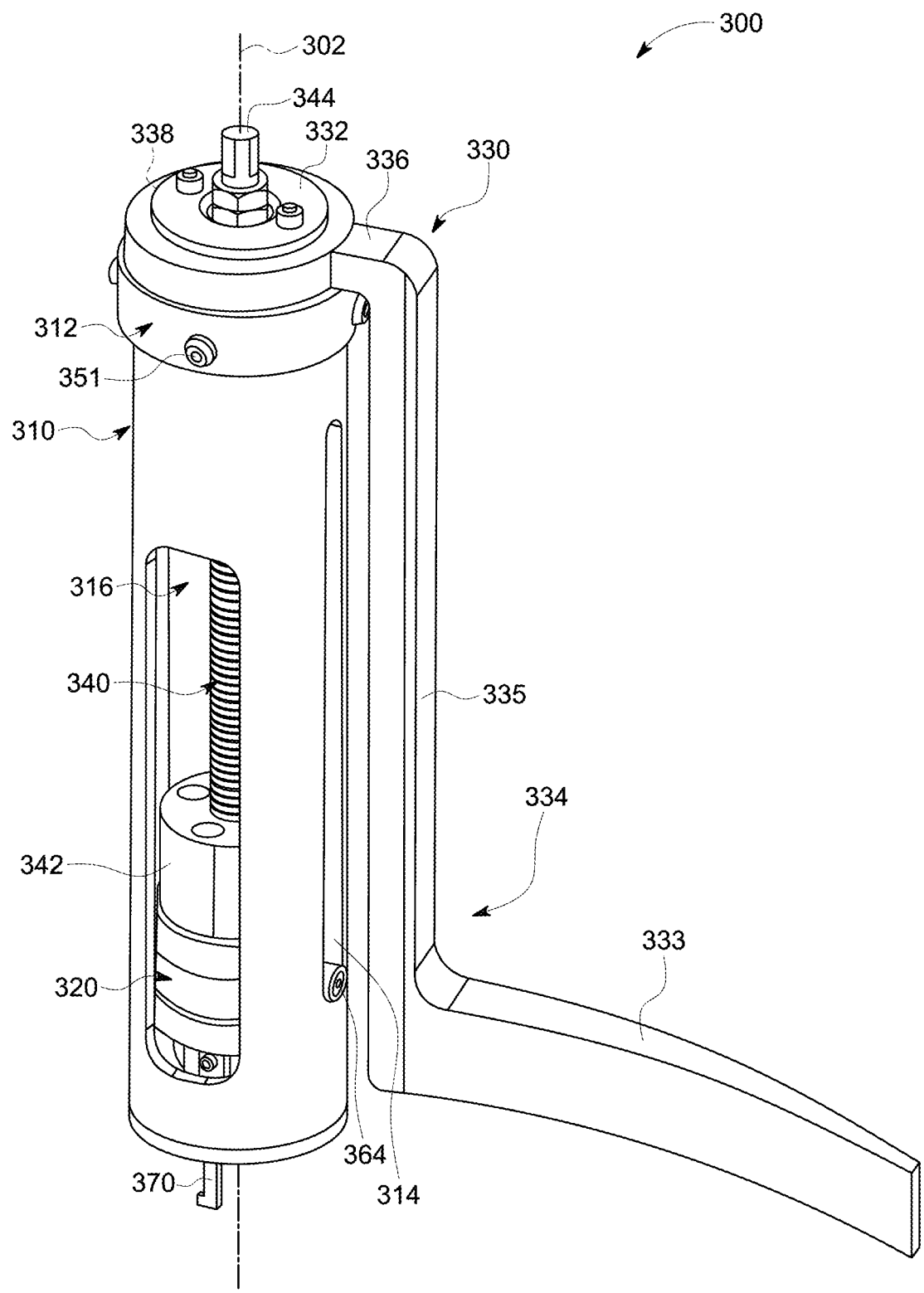
FIG. 11 is a perspective view of an exemplary tool that may be used to remove the bushing of FIG. 4 from the variable stator vane assembly of FIG. 3, according to another aspect of the present disclosure.

FIG. 11 illustrates a removal tool 300, in which a stabilizing structure 330 includes a single reaction arm 334 instead of the pair of reaction arms 224 used in the removal tool 200. The reaction arm 334 is generally L-shaped, having a horizontal arm segment 333 and a square vertical arm segment 335 extending radially outward from an end of the horizontal arm segment 333 proximate to a cylindrical housing 310. The vertical arm segment 335 is connected to, or integral with, a stabilizing collar 336, which includes a circular orifice 338 through which a stacked flange 312 is positioned and secured by a retention plate 332, using screws, as described above.

The stacked flange 312 is fastened to the top of the cylindrical housing 310 by radially oriented fasteners 351. Within the cylindrical housing 310, the lead screw 340 is disposed along a longitudinal axis 302 of the tool 300, and a first end 344 of the lead screw 340 extends through the stacked flange 312 and the retention plate 332. The lead screw 340 is threaded into and through a threaded nut 342, which is mechanically and removably coupled to a pulling module 320. A pair of oppositely disposed puller arms 370 are coupled to a body of the pulling module 320. As described above, the cylindrical housing includes a first pair of elongate slots 314 that provide a track for slideable engagement of the alignment pins 364 and a second pair of elongate slots 316 that reduce weight of the tool 300 and that provide visibility of the pulling module 320 during operation.

Because the pulling module 220, 320 is mechanically coupled to the threaded nut 242, 342, the pulling module 220, 320 may be easily interchanged with a pulling module having a different spacing between the puller arms 270, 370. Such a modification may be advantageous in removing bushings 100 of different sizes, as may be used in different stages of a compressor 14 or in different gas turbines 10.

Additionally, the puller arms 270, 370 are readily removable from the pulling module 220, 320, to facilitate exchange with puller arms 270, 370 having different dimensions or geometries and to facilitate replacement should the puller arms 270, 370 become worn or otherwise damaged.

The skilled artisan will recognize the interchangeability of various components and features from different examples. Similarly, the various methods and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular example. For example, those skilled in the art will recognize that the systems and techniques described herein may be embodied or carried out in a manner that achieves or improves one advantage or group of advantages as taught herein without necessarily achieving other objects or advantages as may be taught or suggested herein.

While only certain features of the technology have been illustrated and described herein, many modifications and changes will occur to those skilled in the art. It is, therefore, to be understood that the appended claims are intended to cover all such modifications and changes as fall within the true spirit of the claimed inventions.

What is claimed is:

1. A tool for removal of a bushing from a stator vane assembly of a plurality of stator vane assemblies arranged in a gas turbine, wherein the bushing is disposed circumferentially around a vane stem of each stator vane assembly in the plurality of stator vane assemblies, the tool comprising:
   a cylindrical housing defining a longitudinal axis;
   a lead screw extending from a first end of the lead screw to a second end of the lead screw along the longitudinal axis through the cylindrical housing, the lead screw being rotatably secured within the cylindrical housing;
   a threaded nut engaged with the second end of the lead screw; and
   a pulling module removably attached to the threaded nut, such that the lead screw passes through the threaded nut before passing through the pulling module, the pulling module comprising a pair of oppositely disposed puller arms, each puller arm comprising a hook portion having an engagement tab configured to engage a respective notch on the bushing;
   a stabilizing structure disposed at a first end of the cylindrical housing, the stabilizing structure including a first reaction arm that extends from the stabilizing structure and is disposed against a neighboring vane stem such that contact between the reaction arm and the neighboring vane stem resists a reaction component of torque from rotating the lead screw,
   wherein the stabilizing structure comprises a stabilizing collar coupled to the first reaction arm and a retention plate that couples the stabilizing collar to a stacked flange, such that the first reaction arm is rotatable about the longitudinal axis;
      wherein the stacked flange is disposed at the first end of the cylindrical housing opposite the pair of puller arms, the stacked flange being removably secured to a perimeter of the cylindrical housing and defining a hole therethrough along the longitudinal axis; and
      wherein the engagement tab of each puller arm is configured to point in a clockwise direction, as viewed from the first end of the lead screw.

2. The tool of claim 1, wherein the first end of the lead screw comprises a drive attachment and a ball bearing and lock washer assembly, the ball bearing and lock washer assembly comprising a rotary component attached to the lead screw and a stationary component attached to the stacked flange.

3. The tool of claim 1, wherein the stabilizing structure is disposed radially outward of the longitudinal axis to stabilize the cylindrical housing in an upright position for removal of the bushing.

4. The tool of claim 3, wherein the stabilizing structure comprises a second reaction arm disposed opposite the first reaction arm, the second reaction arm being coupled to the stabilizing collar.

5. The tool of claim 1, wherein the pulling module comprises a body defining a hole extending therethrough along the longitudinal axis, the hole being an unthreaded hole through which the lead screw extends.

6. The tool of claim 1, wherein the first reaction arm includes a vertical arm segment and a horizontal arm segment.

7. The tool of claim 1, further comprising a pair of anti-rotation pins;
   wherein the pulling module comprises a body defining a circumferential surface and a pair of oppositely disposed, radially-oriented pin sockets defined in the circumferential surface, each one of the pair of anti-rotation pins being disposed in a respective one of the pair of pin sockets; and
   wherein the cylindrical housing comprises a first pair of elongate slots oppositely disposed from one another and extending in a direction of the longitudinal axis, each pin of the pair of anti-rotation pins being slideably engaged within a respective elongate slot of the first pair of elongate slots.

8. The tool of claim 7, wherein the cylindrical housing comprises a second pair of elongate slots offset from the first pair of elongate slots and extending in the direction of the longitudinal axis, each elongate slot of the first pair of elongate slots having a first circumferential width less than a second circumferential width of each elongate slot of the second pair of elongate slots.

9. The tool of claim 1, further comprising a bushing guide attached to the cylindrical housing proximate to the pulling module, the bushing guide defining a partial circumferential wall within the cylindrical housing, the partial circumferential wall having an inner surface that provides for firm sliding contact with an outer surface of the bushing.

10. The tool of claim 9, wherein the bushing guide is removably attached to the cylindrical housing.

11. The tool of claim 1, wherein the tool further comprises a tool alignment bushing threaded to engage the vane stem, the tool alignment bushing being sized to fit within an unthreaded hole defined through the pulling module.

12. A method of removing a bushing from a stator vane assembly of a plurality of stator vane assemblies arranged in a gas turbine, wherein the bushing is disposed circumferentially around a vane stem of each stator vane assembly in the plurality of stator vane assemblies, the method comprising:
   positioning a removal tool radially outward from a bushing, the removal tool comprising a cylindrical housing defining a longitudinal axis, a lead screw extending along the longitudinal axis through the cylindrical housing and being rotatably secured within the cylindrical housing, a threaded nut engaged with an end of the lead screw, and a pulling module removably attached to the threaded nut, such that the lead screw passes through the threaded nut before passing through the pulling module, the pulling module comprising a pair of oppositely disposed puller arms, each puller arm comprising a hook portion having an engagement tab configured to point in a clockwise direction, as viewed from a first end of the lead screw;
   disposing the pair of puller arms of the removal tool in a corresponding pair of notches defined in the bushing, the engagement tab of each puller arm engaging a respective notch of the corresponding pair of notches; and
   rotating the lead screw of the removal tool to adjust the position of the threaded nut and the pulling module removably attached to the threaded nut until the bushing is removed; and
   stabilizing the removal tool using a stabilizing structure disposed at a first end of the cylindrical housing, the stabilizing structure including a first reaction arm that extends from the stabilizing structure and is disposed against a neighboring vane stem such that contact between the first reaction arm and the neighboring vane stem resists a reaction component of torque from rotating the lead screw, wherein the stabilizing structure comprises a stabilizing collar coupled to the first reaction arm and a retention plate that couples the stabilizing collar to a stacked flange, such that the first reaction arm is rotatable about the longitudinal axis, and the retention plate coupling the stabilizing collar to the stacked flange attached to the cylindrical housing.

13. The method of claim 12, wherein a second reaction arm is coupled to the stabilizing collar opposite the first reaction arm.

14. The method of claim 12, wherein rotating of the lead screw causes a pair of anti-rotation pins to slide within a first pair of elongate slots defined in the cylindrical housing and extending in a direction of the longitudinal axis, the pair of anti-rotation pins being disposed in a corresponding pair of oppositely disposed, radially-oriented pin sockets defined in a circumferential surface of a body of the pulling module.

15. The method of claim 12, further comprising, prior to the positioning of the removal tool, attaching a bushing guide to the cylindrical housing proximate to the pulling module, the bushing guide defining a partial circumferential wall within the cylindrical housing, the partial circumferential wall having an inner surface that provides for firm sliding contact with an outer surface of the bushing.

16. The method of claim 12, wherein positioning of the removal tool first comprises threading a tool alignment bushing onto the vane stem, the tool alignment bushing being sized to fit within an unthreaded hole defined through the pulling module.

17. The method of claim 12, wherein the lead screw is provided with a drive attachment configured to facilitate the rotating of the lead screw.

* * * * *